United States Patent
Yoshimura et al.

(10) Patent No.: US 7,091,978 B2
(45) Date of Patent: Aug. 15, 2006

(54) PROCESSING APPARATUS AND PHOTOGRAPHING DEVICE

(75) Inventors: Shinichi Yoshimura, Tokyo (JP); Kazuya Yonemoto, Kanagawa (JP)

(73) Assignee: Sony Corporation, Tokyo (JP)

(*) Notice: Subject to any disclaimer, the term of this patent is extended or adjusted under 35 U.S.C. 154(b) by 127 days.

(21) Appl. No.: 10/009,857

(22) PCT Filed: Apr. 9, 2001

(86) PCT No.: PCT/JP01/03041

§ 371 (c)(1),
(2), (4) Date: May 6, 2002

(87) PCT Pub. No.: WO01/78006

PCT Pub. Date: Oct. 18, 2001

(65) Prior Publication Data

US 2002/0163491 A1 Nov. 7, 2002

(30) Foreign Application Priority Data

Apr. 10, 2000 (JP) ............................ P2000-107723

(51) Int. Cl.
*G06F 15/00* (2006.01)
*G06T 1/60* (2006.01)
(52) U.S. Cl. ...................... 345/501; 345/418; 345/530; 348/294; 348/300; 348/301; 348/302; 348/311
(58) Field of Classification Search ................ 345/581, 345/418, 501, 530; 348/294, 300, 301, 302, 348/311; 356/338; 702/159
See application file for complete search history.

(56) References Cited

U.S. PATENT DOCUMENTS

| 4,454,416 A | * | 6/1984 | Gontowski et al. ...... 250/214 A |
| 5,079,624 A | * | 1/1992 | Sasuga et al. ............... 358/530 |
| 5,276,521 A | * | 1/1994 | Mori ........................... 348/243 |
| 6,600,160 B1 | * | 7/2003 | Kobayashi et al. ..... 250/370.14 |

FOREIGN PATENT DOCUMENTS

| JP | 04-360284 | 12/1992 |
| JP | 10-145680 | 5/1998 |
| JP | 2000-299820 | 10/2000 |

OTHER PUBLICATIONS

"Designing ultra parallel, ultra high speed vision chip using general purpose processing element (translated title)" by Komuro et al., Journal of The Institute of Electronics, Information and Communication Engineers, Japan, vol. J81-D-1, No. 2, pp. 70-76, 1998.

* cited by examiner

Primary Examiner—Kee M. Tung
Assistant Examiner—Tam D. Tran
(74) Attorney, Agent, or Firm—Bell, Boyd & Lloyd LLC

(57) ABSTRACT

A pixel operable within a photographing device includes a light receiving portion for generating an electric signal corresponding to an intensity of received light, an amplifying portion for amplifying an output signal of the light receiving portion, a number of storing portions for storing, as a current signal, an electric signal amplified by the amplifying portion, a load portion for converting current outputs of the number of storing portions into voltages, a bias portion for supplying an offset current to an input of the load portion, and a calculating portion for calculating an output of the load portion, wherein a number of the pixels are arranged in a matrix. The storing portions and the photographing device are disposed on the same circuit, thereby expediting pixel processing. Additionally, with a bias, the output becomes stable.

18 Claims, 14 Drawing Sheets

PROCESSING APPARATUS AND PHOTOGRAPHING DEVICE

BACKGROUND OF THE INVENTION

The present invention generally relates to a picture processing apparatus for processing a picture photographed by a photographing device. More specifically, the present invention relates to a picture processing apparatus with a photographing device and a storing portion disposed on the same circuit thereby accelerating a calculating process, and to a picture processing apparatus for suppressing characteristics of the storing portion from fluctuating even if a temporal change in brightness of an object is diminutive, thereby ensuring an accurate calculation output.

With a picture of an object photographed as a first frame and a picture of the object photographed as a second frame, the temporal change in brightness of the object can be obtained.

Conventionally, when the difference between pictures is obtained, a camera that is equipped with a photographing device such as a CCD (Charge Coupled Device), a plurality of frame memories, and a calculating apparatus are prepared and connected. In other words, picture data of a first frame that is output from the camera is temporarily stored in a frame memory. Thereafter, picture data of a second frame that is photographed is stored in another frame memory. The calculating apparatus synchronously reads the contents (namely, picture data) stored in the frame memories and calculates the difference of the corresponding pictures.

However, since picture data is transferred from the camera to the frame memories in the serial method, the transfer time for one screen can be rather long. For example, in an NTSC (National Television System Committee) type camera of which the CCD is used as a photographing device, while a picture of one frame is being photographed, a picture of the preceding frame is read. Thus, until a picture of one frame is read and transferred, it takes as long as 33 msec. Consequently, after a picture is photographed, until the calculated result is obtained, it takes at least 33 msec.

FIG. 10 shows a timing chart of which a photographed picture is stored and read in the CCD as a photographing device. As shown in FIG. 10, it takes 33 msec until a picture of each of odd fields and even fields is stored. Additionally, as shown in FIG. 10, unless the read period for a picture of the second frame elapses, the calculated result cannot be obtained.

Thus, it is difficult to apply the conventional photographing system using a camera composed of a CCD photographing device to a controlling system using visual information such as visual feedback.

Conversely, in a prototype CMOS image sensor, the frame rate is raised to as high as around 1 kHz and while pictures are being photographed at very high speed, a calculating process is successively performed so as to accomplish the visual feedback. However, in such a sensor, since internal processes are digitally performed, it is necessary to provide, for example, an A/D converting circuit for converting analog values into digital values, a storing circuit for storing digital values, and a calculating circuit for calculating digital values. Since these circuit modules have large circuit scales, they are not suitable for a many-pixel device. Thus, it is difficult to commercially use such a sensor (refer to "Designing ultra parallel, ultra high speed vision chip using general purpose processing element (translated title)" by Komuro et. al., Journal of The Institute of Electronics, Information and Communication Engineers, Japan, Vol. J81-D-1, No. 2, pp. 70–76, 1998).

Additionally, a CMOS image sensor for calculating analog signals as they are has been proposed. In such sensors, a memory function is accomplished by storing a signal voltage to a capacitor. Thus, depending on how a capacitor is structured, each pixel becomes large. Even if the number of pixels can be increased by disposing a memory portion at a non-pixel area, such a method is not suitable for reducing the size of the chip.

Also, when a signal voltage is stored to a capacitor, if a signal voltage of another capacitor is read as a gate voltage of another transistor, since threshold voltages of individual transistors fluctuate, there is a risk that a signal may be read as a different value. As a result, the calculated result may contain an error. In addition, when a signal voltage is stored to a capacitor, since the charging time cannot be ignored, such sensors are not suitable for high speed processes.

SUMMARY OF THE INVENTION

An advantage of the present invention is, therefore, to provide an excellent picture processing apparatus for obtaining the difference between picture frames so as to obtain a temporal change in brightness of an object.

Another advantage of the present invention is to provide an excellent picture processing apparatus in which a photographing device and a storing portion for storing photographed data are disposed on the same circuit so as to perform a calculating process at high speed.

A further advantage of the present invention is to provide an excellent picture processing apparatus that allows characteristics of a storing portion to be suppressed from fluctuating and an accurately calculated output to be obtained in a situation where a temporal change of brightness of an object is small.

A picture processing apparatus according to an embodiment of the present invention includes a light receiving portion for generating an electric signal corresponding to the intensity of received light. An amplifying portion is provided for amplifying an output signal of the light receiving portion. A number of storing portions are provided for storing, as a current signal, an electric signal amplified by the amplifying portion. Also provided is a load portion for converting current outputs of the number of storing portions into voltages. A bias portion is provided for supplying an offset current to an input of the load portion. Also provided is a calculating portion for calculating an output signal of the load portion. An outputting portion is provided for outputting a calculated result of the calculating portion to the outside.

The storing portions may store current signals corresponding to the received light in different periods. Preferably, the calculating portion performs a calculating process such as addition, subtraction, or a comparison for the voltage signals based on the current signals extracted from at least two of the storing portions. The amplifying portion may contain mirror transistors that are connected so that their gate electrodes face each other and amplify the current signals based on the theory of current mirror amplification. The storing portion may store the current signals based on the theory of a current copier circuit. Preferably, when the calculating portion compares the signal currents supplied from two of the storing portions, the bias portion may add an offset current to a signal current supplied from one of the two storing portions but does not add the offset current to the signal current supplied from the other storing portion. As a result, the influence of an output to the calculating portion due to characteristic fluctuations of the individual storing portions can be suppressed.

According to another embodiment of the present invention, a photographing device having a number of pixels arranged on the same circuit in a matrix is provided for detecting the brightness of an object. Each of the pixels includes a light receiving portion for generating an electric signal corresponding to the intensity of received light. An amplifying portion amplifies an output signal of the light receiving portion. An electric signal amplified by the amplifying portion is stored as a current signal in a number of storing portions. A load portion is provided for converting the current outputs of the number of storing portions into voltages. A bias portion is provided for supplying an offset current to an input of the load portion, and a calculating portion is provided for calculating an output signal of the load portion. Finally, an outputting portion is provided for outputting a calculated result from the calculating portion.

Preferably, in the photographing device, the storing portions may store current signals corresponding to the received light in different periods. The calculating portion may perform a calculating process such as addition, subtraction, or a comparison for the voltage signals based on the current signals extracted from at least two of the storing portions. The amplifying portion may contain mirror transistors that are connected so that their gate electrodes face each other and amplify the current signals based on the theory of current mirror amplification. The storing portion may store the current signals based on the theory of a current copier circuit. Preferably, when the calculating portion compares the signal currents supplied from two of the storing portions, the bias portion may add an offset current to a signal current supplied from one of the two storing portions but does not add the offset current to the signal current supplied from the other storing portion. As a result, the influence of an output to the calculating portion due to characteristic fluctuations of the individual storing portions can be suppressed.

According to yet another embodiment of the present invention, a photographing device for detecting the brightness of an object is provided. The photographing device includes a pixel area in which pixels are arranged in a matrix, each pixel being composed of a light receiving portion for generating an electric signal corresponding to the intensity of received light and an amplifying portion for amplifying an output signal of the light receiving portion. The photographing device further includes a second amplifying portion area in which second amplifying portions are arranged in each column of the matrix of the pixels in the pixel area. Each of the second amplifying portions amplifies a current signal based on the theory of current mirror amplification of mirror transistors that are connected so that their gate electrodes face each other. Also included in photographing device is a pixel-outside storing area in which a number of storing portions are arranged in a matrix corresponding to the arrangement of the pixels in the pixel area, each of the storing portions storing, as a current signal, an electric signal that has been amplified. Still further, the photographing device includes a load portion and calculating portion area in which load portions and calculating portions are arranged in each column of the matrix of the pixels of the pixel area, each of the load portions converting the current output of the corresponding storing portion into a voltage and each of the calculating portions performing a calculating process. The photographing device also includes an outputting portion area in which outputting portions are arranged in each column of the matrix of the pixels of the pixel area, each of the outputting portions outputting the calculated result of the corresponding calculating portion. Preferably, the pixel area, the second amplifying portion area, the pixel-outside storing area, the load portion and calculating portion area, and the outputting portion area are disposed on the same circuit.

The storing portions may store current signals corresponding to the received light in different periods. The calculating portions may perform a calculating process such as addition, subtraction, or a comparison for the voltage signals corresponding to the current signals extracted from two or more of the storing portions. The photographing device may further include a bias portion for adding an offset current to an output current of the corresponding storing portion. In such a structure, when the calculating portion compares the signal currents supplied from two of the storing portions, the bias portion may add an offset current to a signal current supplied from one of the two storing portions but does not add the offset current to the signal current supplied from the other storing portion. As a result, the influence of an output to the calculating portion due to characteristic fluctuations of the individual storing portions can be suppressed. The storing portion may store the current signals based on the theory of a current copier of circuit.

In an embodiment, a picture processing apparatus includes a light receiving portion for generating an electric signal corresponding to intensity of received light, an amplifying portion for amplifying an output signal of the light receiving portion, a number of storing portions for storing, as a current signal, an electric signal amplified by the amplifying portion, a load portion for converting current outputs of the storing portions into voltages, a bias portion for supplying an offset current to an input of the load portion, and a calculating portion for calculating an output of the load portion.

According to an embodiment of the structure of the picture processing apparatus of the present invention, since a storing portion and a photographing device are disposed on the same circuit, the process can be performed at a high speed. In addition, since a bias portion adds an offset current to a current signal that is output from the storing portion and that has not been calculated, the influence of characteristics of the storing portion can be suppressed, thereby allowing an output of the calculating portion to become stable.

For example, when the picture processing apparatus according to an embodiment of the present invention is used as a pixel and each pixel is arranged in a matrix on the same circuit, a photographing device with a calculating function can be structured. With the photographing device, a temporal change of brightness of an object can be calculated at high speed.

Additional features and advantages of the present invention are described in, and will be apparent from, the following Detailed Description of the Invention and the figures.

DETAILED DESCRIPTION OF THE INVENTION

Figure 1:
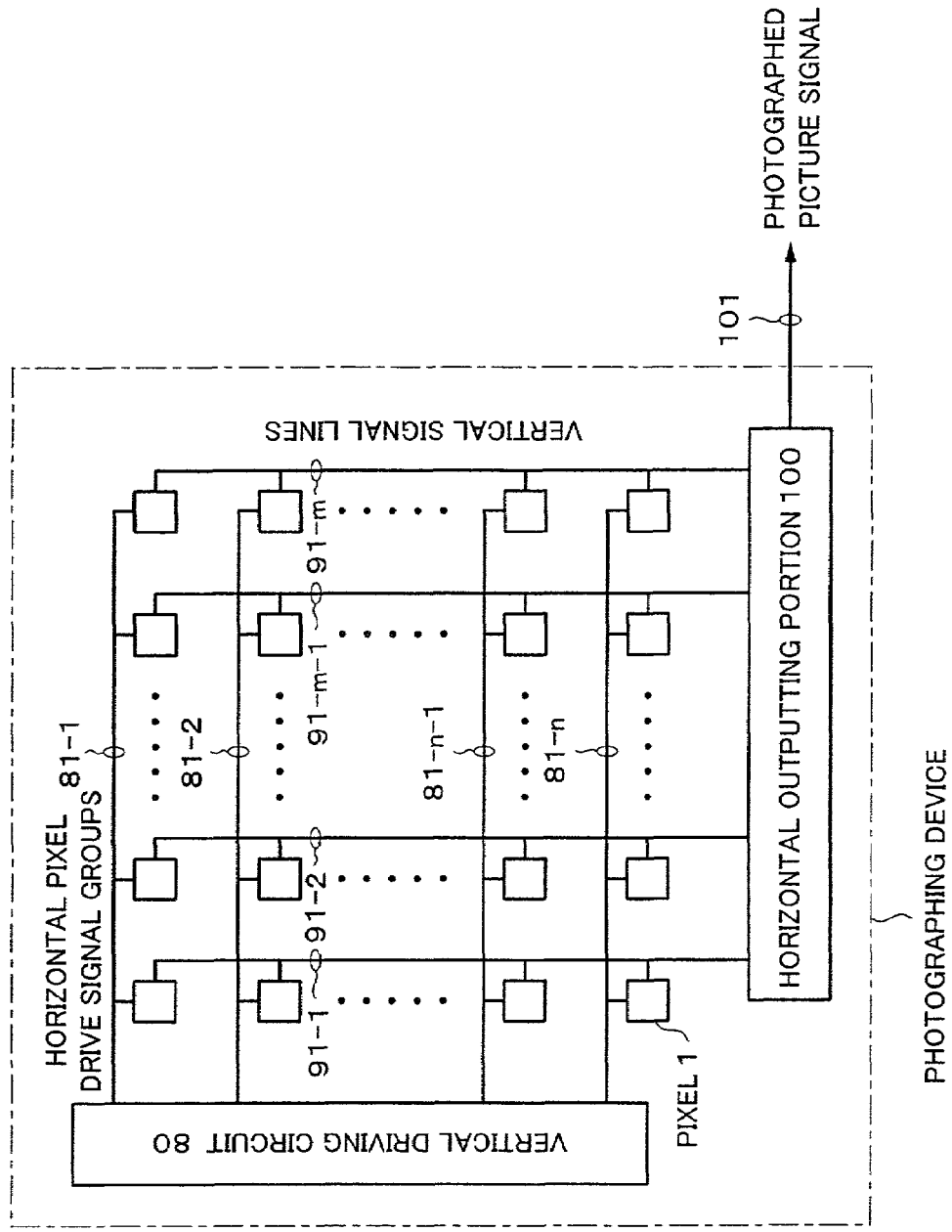
FIG. 1 is a schematic diagram showing the structure of a circuit of a photographing device according to an embodiment of the present invention.

FIG. 1 schematically shows the structure of a circuit of a photographing device according to an embodiment of the present invention. As shown in FIG. 1, the photographing device is composed of m×n pixels 1 arranged in a matrix shape. On the respective lines of the matrix, horizontal pixel drive signal groups 81-1, 81-2, . . . , 81-$n$ are disposed. On the respective columns of the matrix, vertical signal lines 91-1, 91-2, . . . , 91-$m$ are disposed.

The horizontal pixel drive signal groups 81 contain signals that synchronously drive each portion of the pixels. The signals are output from a vertical driving circuit 80. The vertical signal lines are signal lines for outputting photographed picture signals of the pixels. The vertical signal lines 91 are disposed toward a horizontal outputting portion 100.

Figure 2:
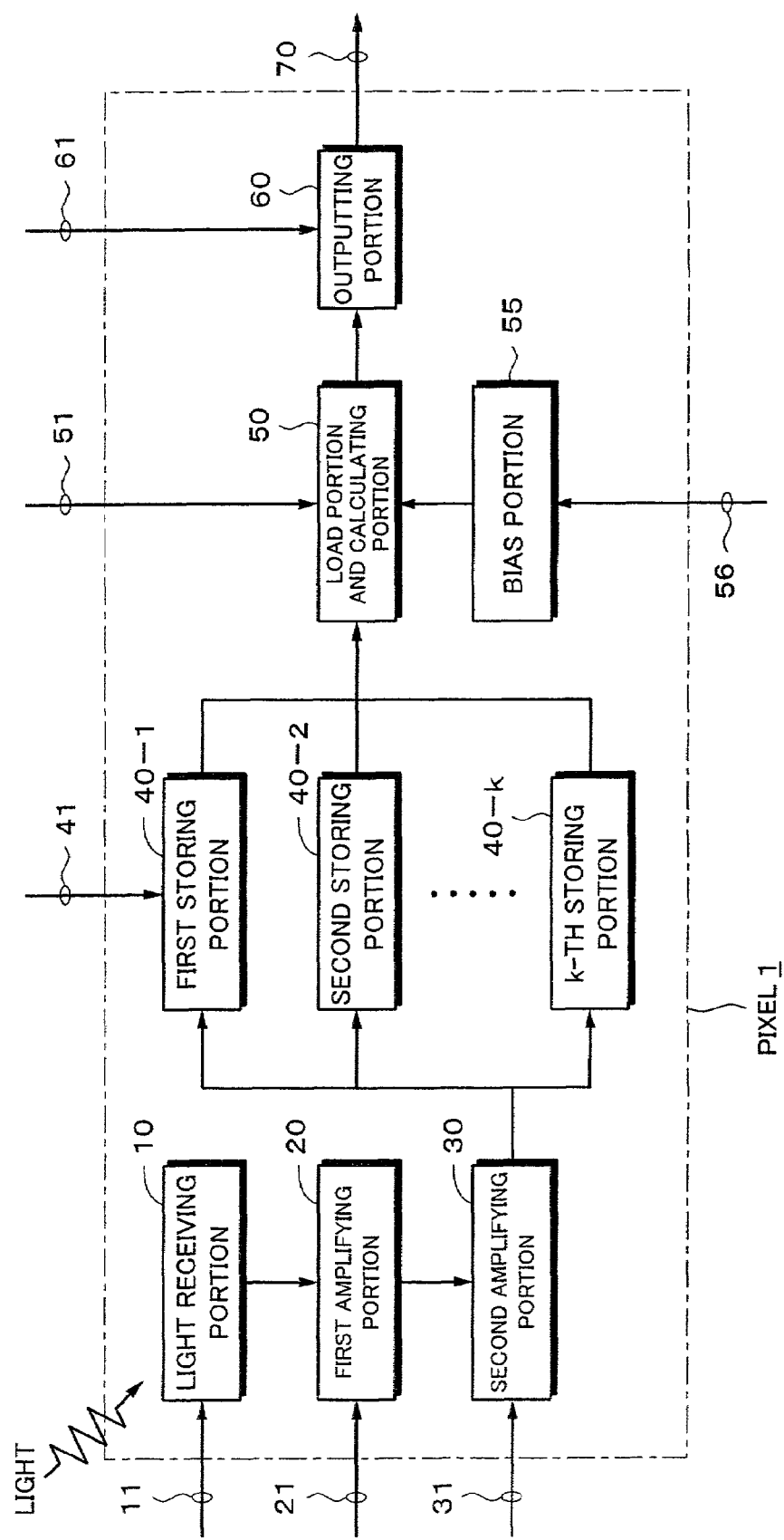
FIG. 2 is a schematic diagram showing the internal structure of a pixel disposed in the photographing device according to an embodiment of the present invention.

FIG. 2 shows the internal structure of an embodiment of one of the pixels 1 arranged in the photographing device. As shown in FIG. 1, the pixel 1 is composed of a light receiving portion 10, a first amplifying portion 20, a second amplifying portion 30, k storing portions of a first storing portion 10-1 to a k-th storing portion 40-$k$, a load and calculating portion 50, a bias portion 55, and an outputting portion 60.

The light receiving portion 10 is a photoelectric converting portion. Conventionally, the light receiving portion 10 is composed of a photo diode (PD) or the like. The operation of the light receiving portion 10 is controlled by a light receiving portion drive signal 11.

The first amplifying portion 20 converts a current signal transferred from the light receiving portion 10 into a level suitable for a process of the second amplifying portion 30 on the next stage of the first amplifying portion 20. In addition, the first amplifying portion 20 outputs the current signal at a timing defined by a first amplifying portion drive signal 21.

The second amplifying portion 30 converts a current signal transferred from the first amplifying portion 20 into a level suitable for a processing process of each storing portion 40 on the next stage. In addition, the second amplifying portion 30 outputs the current signal at a timing defined by a second amplifying portion drive signal 31.

The k storing portions of the first storing portion 40-1 to the k-th storing portion 40-$k$ are connected to an output of the second amplifying portion 30. The k storing portions store and hold the current of the amplified signal at a proper timing defined by a storing portion drive signal 41. The number k of storing portions disposed in one pixel depends on a calculating process performed in the next stage.

The load portion and calculating portion 50 is connected to all outputs of the first storing portion 40-1 to the k-th storing portion 40-$k$. The load portion and calculating portion 50 converts output currents of all or part of the storing portions 40 into corresponding voltages. In addition, the load portion and calculating portion 50 performs a calculating process at a proper timing defined by a calculating portion drive signal 51. Although the calculating process depends on the function of the photographing device, the calculating process includes an addition, a subtraction, a comparison, and the like of signals.

The bias portion 55 generates a bias current for eliminating noise corresponding to a bias portion drive signal 56 thereby enabling the calculating portion 50 to properly perform the calculating process.

The outputting portion 60 converts the calculated result of the load portion and calculating portion 50 into a level suitable for an output to signal lines of the photographing device. The outputting portion 60 outputs the converted signal as a pixel output 70 at a proper timing corresponding to an outputting portion drive signal 61.

The drive signals 11 to 61 for each portion are supplied as the horizontal pixel drive signal groups 81 to each pixel 1 of the photographing device. A vertical driving circuit 80 generates the drive signals 11 to 61 and drives m pixels arranged in the horizontal direction with the drive signals 11 to 61.

A pixel output 70 of each pixel is connected with the vertical signal lines 91, each of which connects pixels arranged in the column (vertical) direction. The vertical signal lines 91-1, 91-2, . . . 91-$m$ are connected to the horizontal outputting portion 100 and extracted as a photographed picture signal 101 outside the photographing device.

When the number m of pixels that are horizontally arranged in the photographing device is small, the pixel output 70 may be converted into a proper level and then extracted as m parallel outputs outside the photographing device.

Figure 3:
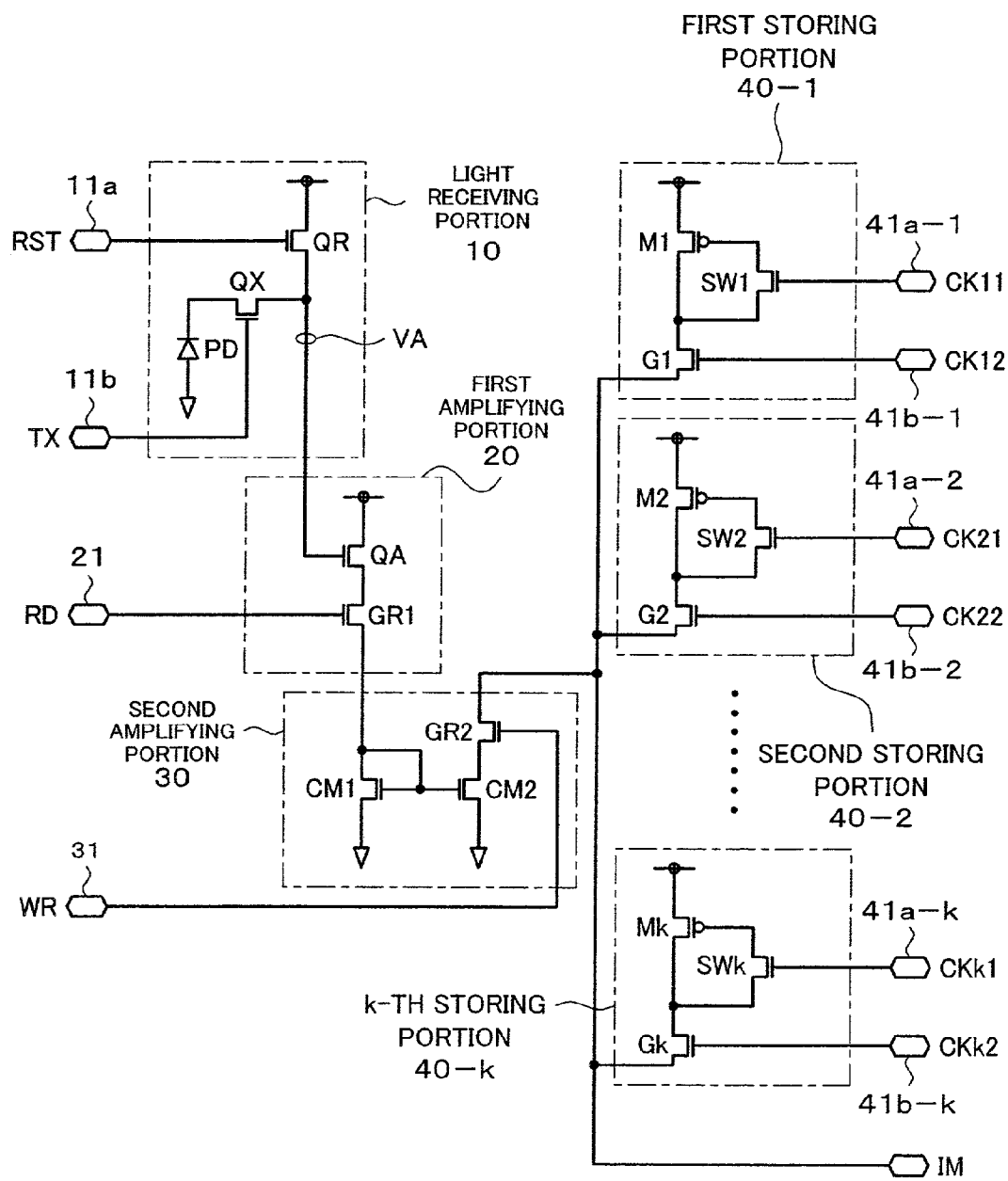
FIG. 3 is a schematic diagram showing the structure of an embodiment of a circuit including a light receiving portion, a first amplifying portion, a second amplifying portion, and storing portions.

The structure of a practical circuit of the pixel 1 according to an embodiment will be described with reference to FIG. 3. As shown in FIG. 3, the structure of the circuit includes the light receiving portion 10, the first amplifying portion 20, the second amplifying portion 30, and the first storing portion 40-1 to the k-th storing portion 40-$k$.

The light receiving portion 10 is composed of a photodiode (PD) or the like, a reset transistor (QR), and a transfer transistor (QX). A reset pulse (RST) is input to a gate terminal of the reset transistor (QR). A transfer pulse (TX) is input as light receiving portion drive signals 11a and 11b to a gate terminal of the transfer transistor (QX).

The first amplifying portion 20 is composed of an amplifying transistor (QA) and a read transistor (GR1). A read pulse (RD) is input as a first amplifying portion drive signal 21 to a gate terminal of the read transistor (GR1).

The second amplifying portion 30 is composed of a current mirror circuit and a read transistor (GR2). The current mirror circuit is composed of a mirror transistor (CM1) and a mirror transistor (CM2) whose gate electrodes face each other. A write pulse (WR) that defines a signal transfer timing for the storing portions 40 in the next stage of the second amplifying portion 30 is input as a second amplifying portion drive signal 31 to the read transistor (GR2).

Each of the first storing portion 40-1 to the k-th storing portion 40-k is composed of a memory transistor (M1 to Mk), a memory gate transistor (G1 to Gk), and a memory switch (SW1 to SWk). A storage pulse (CK11 to CKk1) and a storage pulse (CK12 to CKk2) are input as storing portion drive signals 41a and 41b to the memory switch (SW1 to SWk) and the memory gate transistor (M1 to Mk), respectively.

An output signal of the second amplifying portion 30 and input and output signals of the first storing portion 40-1 to the k-th storing portion 40-k are connected with a common signal line. In the following description, a current that passes through the signal line is denoted by a common signal IM.

Figure 4:
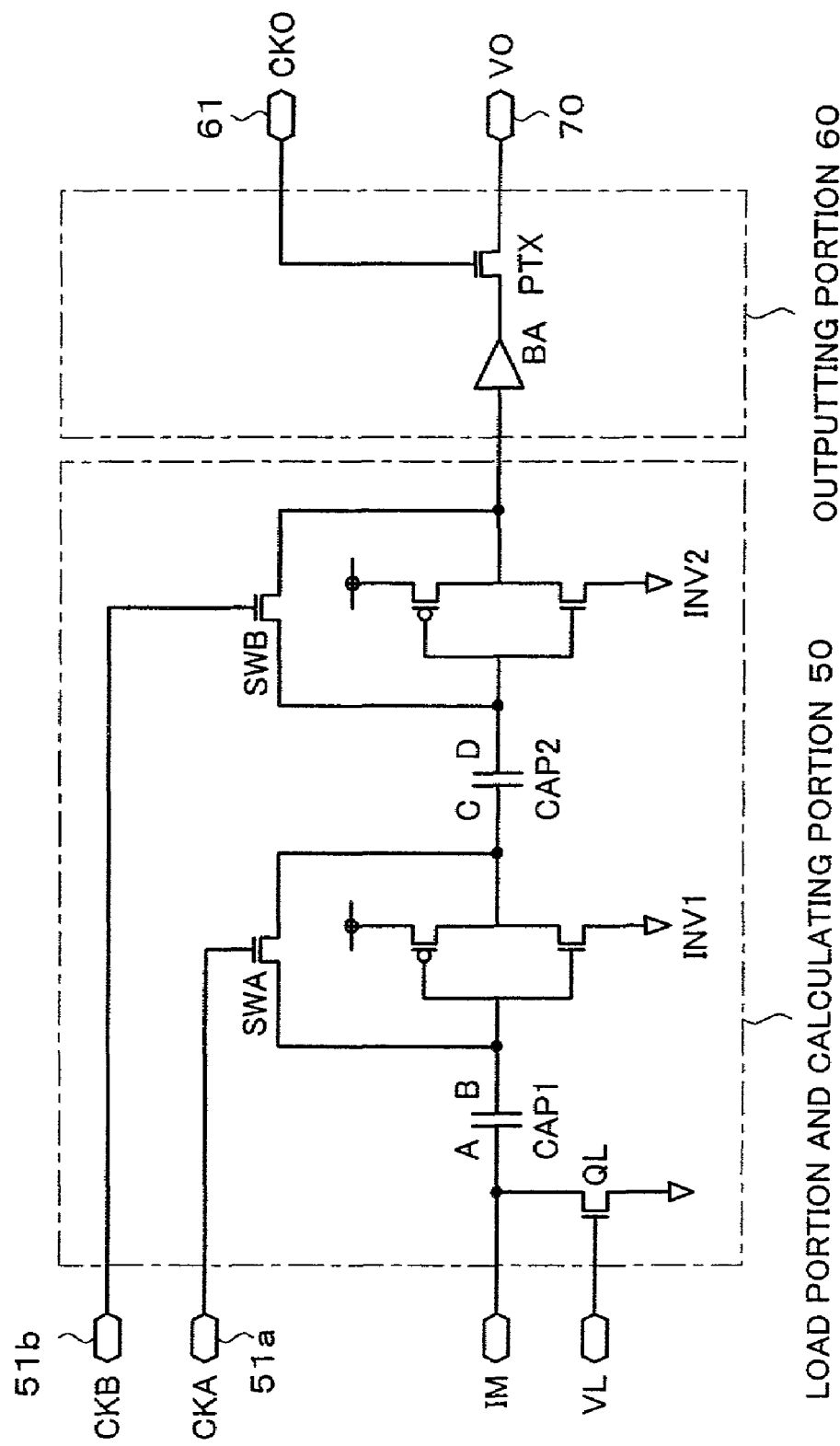
FIG. 4 is a schematic diagram showing the structure of an embodiment of a circuit including a loading portion and calculating portion and an outputting portion.

FIG. 4 shows the structure of an embodiment of a circuit of the load portion and calculating portion 50 and the outputting portion 60.

The load portion and calculating portion 50 is composed of a load transistor (QL), an inverter (INV1), an inverter (INV2), a capacitor (CAP1), a capacitor (CAP2), an inverter switch (SWA), and an inverter switch (SWB).

An inverter pulse CKA and an inverter pulse CKB are input as calculating portion drive signals 51a and 51b to a gate terminal of the inverter switch (SWA) and a gate terminal of the inverter switch (SWB), respectively.

A load bias voltage (VL) is input to a gate terminal of the load transistor (QL). The load bias voltage (VL) defines the operation point of the load transistor (QL).

The capacitor (CAP1), the inverter (INV1), and the inverter switch (SWA) compose one chopper type comparator. Likewise, the capacitor (CAP2), the inverter (INV2), and the inverter switch (SWB) compose one chopper type comparator.

The outputting portion 60 is composed of a buffer amplifier (BA) and a pixel output gate (PTX). An output pulse (CK0) is input as an outputting portion drive signal 61 to a gate terminal of the pixel output gate (PTX). An output of the pixel output gate (PTX) becomes a pixel output (V0) of the pixel 1.

Next, operational characteristics of one pixel 1 will be described. The operation of the pixel 1 can be categorized as a reset period, a transfer period, a storage period, a calculation phase 1, and a calculation phase 2.

Reset Period

First, when the reset pulse (RST) is applied, the reset transistor (QR) is activated. As a result, the voltage on the drain side of the reset transistor (QR) (namely, a received light signal voltage (VA)) is set to a predetermined voltage corresponding to the power supply voltage (the predetermined voltage is temporarily denoted by VR).

Transfer Period

Thereafter, when a transfer pulse (TX) is applied, the transfer transistor (QX) is activated. As a result, in the storage period, signal electric charges (electrons) that have been photo-electrically converted by the photodiode (PD) of the light receiving portion 10 are transferred to the drain side of the reset transistor (QR). As a result, the received light signal voltage (VA) becomes the voltage corresponding to the number of signal electric charges.

Storage Period

The received light signal voltage (VA) is the gate voltage of the amplifying transistor (QA) of the first amplifying portion 20. Thus, when a read pulse (RD) is applied, the read transistor (GR1) is activated. As a result, a signal current corresponding to the received light signal voltage (VA) flows to the mirror transistor (CM1) of the second amplifying portion 30.

As a result, due to the theory of current mirror (i.e., amplification utilizing a current mirror circuit), a current with an amount that depends on the size ratio of the mirror transistor (CM1) flows to the other mirror transistor (CM2).

When a write pulse (WR) is applied, the read transistor (GR2) of the second amplifying portion 30 is activated. In addition, when a storage pulse (CK12) is applied, the memory gate transistor (G1) of the first storing portion 40-1 is activated. Moreover, when a storage pulse (CK11) is applied, the memory switch (SW1) of the first storing portion 40-1 is activated. As a result, a current that passes through the mirror transistor (CM2) flows to the memory transistor (M1).

In addition, when the memory switch (SW1) is deactivated and then the memory gate transistor (G1) and the transistor (GR2) are deactivated, the current that flows to the memory transistor (M1) can be stored.

The storing operation is accomplished in such a manner that the gate voltage that defines the value of the current that flows between the source and the drain of the memory transistor (M1) is charged to a relatively smaller gate capacity (i.e., the theory of current copier employing a current copier circuit). Thus, it is not necessary to charge a large capacity such as a capacitor. As a result, since the storing operation is completed in a short period, the operation time of the pixel 1 can be shortened.

In the embodiment described above, a current that corresponds to the received light signal voltage (VA) is stored to the memory transistor (M1) of the first storing portion 40-1. This operation can apply to a current that corresponds to the received light signal voltage (VA) that is stored to the other storing portions 40-2, . . . , 40-k.

Thus, when a signal that has been photo-electrically converted in another period is stored to the memory transistor of another storing portion 40, a calculation (for example, a comparison between signals) can be accomplished in the pixel 1.

It is assumed that respective currents that correspond to signals that have been photo-electrically converted in different periods have been stored in the memory transistor (M1) of the first storing portion 40-1 and the memory transistor (M2) of the second storing portion 40-2. Thus, the currents that have been stored in the transistors M1 and M2 are denoted by IM1 and IM2, respectively.

Calculation Phase

When the memory gate transistor (G1) of the first storing portion 40-1 is activated, the current IM1 stored in the memory transistor (M1) flows to the load transistor (QL). As a result, a voltage (temporarily denoted by V1) that depends on the amount of the current IM1 and the load bias voltage (VL) takes place on the electrode A side of the capacitor (CAP1).

However, when the load bias voltage (VL) is applied in only the period of the calculation phase 1 and the loading bias voltage (VL) is 0 V in other periods, a current can be prevented from flowing to the load transistor (QL).

When the inverter switch (SWA) is activated so that the input and the output of the inverter (INV1) is short-circuited, a voltage (Vinv1) at the operation point of the inverter (INV1) takes place on the electrode B side of the capacitor (CAP1). As a result, a potential of the difference between V1 and Vinv1 takes place between the A side and the B side of the capacitor (CAP1).

In addition, after the inverter switch (SWB) that short-circuits the input and the output of the inverter (INV2) is activated along with the inverter switch (SWA), the inverter switch (SWB) is deactivated just after the inverter switch (SWA) is deactivated. At that point, the output voltage (Vo1) of the inverter (INV1) and the voltage (Vinv2) at the operation point of the inverter (INV2) are applied on the C side and the D side of the capacitor (CAP2). Thus, a potential of the difference takes place between both the sides.

It should be noted that when the inverter switch (SWA) is deactivated from the activated state, each voltage on the input side and the output side of the inverter (INV1) may slightly fluctuate from voltages that take place when they are short-circuited due to the effect of charge injection. In the embodiment shown in FIG. 4, such a voltage fluctuation component can be absorbed by the capacitor (CAP2).

Calculation Phase 2

Thereafter, when the memory gate transistor (G2) of the second storing portion 40-2 is activated, the current IM2 that is stored in the memory transistor (M2) flows to the load transistor (QL). As a result, a voltage (temporarily denoted by V2) that depends on the amount of the current IM2 and the load bias voltage (VL) takes place on the electrode A side of the capacitor (CAP2).

When the voltage V2 is higher than the voltage V1, assuming that the input capacitance of the inverter (INV1) is so small that it can be ignored (i.e., it is negligible), the voltage on the B side of the capacitor (CAP1) rises by V2−V1 from the voltage (Vinv1) at the operation point. Thus, the signal level of the output of the inverter (INV1) becomes low.

As a result, the voltage on the electrode D side of the capacitor (CAP2) becomes lower than the voltage (Vinv2) at the operation point. Thus, the signal level of the output of the inverter (INV2) becomes high.

In contrast, when the voltage V2 is lower than the voltage V1, the voltage of the electrode B side of the capacitor (CAP1) lowers by V1−V2 from the voltage (Vinv1) at the operation point. Thus, the signal level of the output of the inverter (INV1) becomes high.

As a result, the voltage on the electrode D of the capacitor (CAP2) becomes higher than the voltage (Vinv2) at the operation point. Thus, the signal level of the output of the inverter (INV2) becomes low.

In other words, when the current IM2 stored in the memory transistor (M2) of the second storing portion 40-2 is larger than the current IM1 stored in the memory transistor (M1) of the first storing portion 40-1, the signal level of the output of the calculating portion 50 becomes high. In contrast, when the current IM1 is larger than the current IM2, it is clear that the signal level of the output of the calculating portion 50 becomes low.

In such a manner, the calculating portion 50 can compare the amounts of current stored in the storing potions 40 (namely, comparing the intensity or brightness of the received light).

An output of the calculating portion 50 is amplified to a proper level by the buffer amplifier (BA) of the outputting portion 60. When an output pulse (CK0) is applied, the pixel output gate (PTX) is activated. As a result, the amplified output is output as a pixel output V0.

In the above-described operation, a calculated result for one pixel is obtained as a pixel output. Thus, when such phases from storage period to calculation phase 2 are repeated corresponding to the number of pixels, pixel outputs can be obtained from the pixels 1 that are arranged in the vertical direction.

Figure 5:
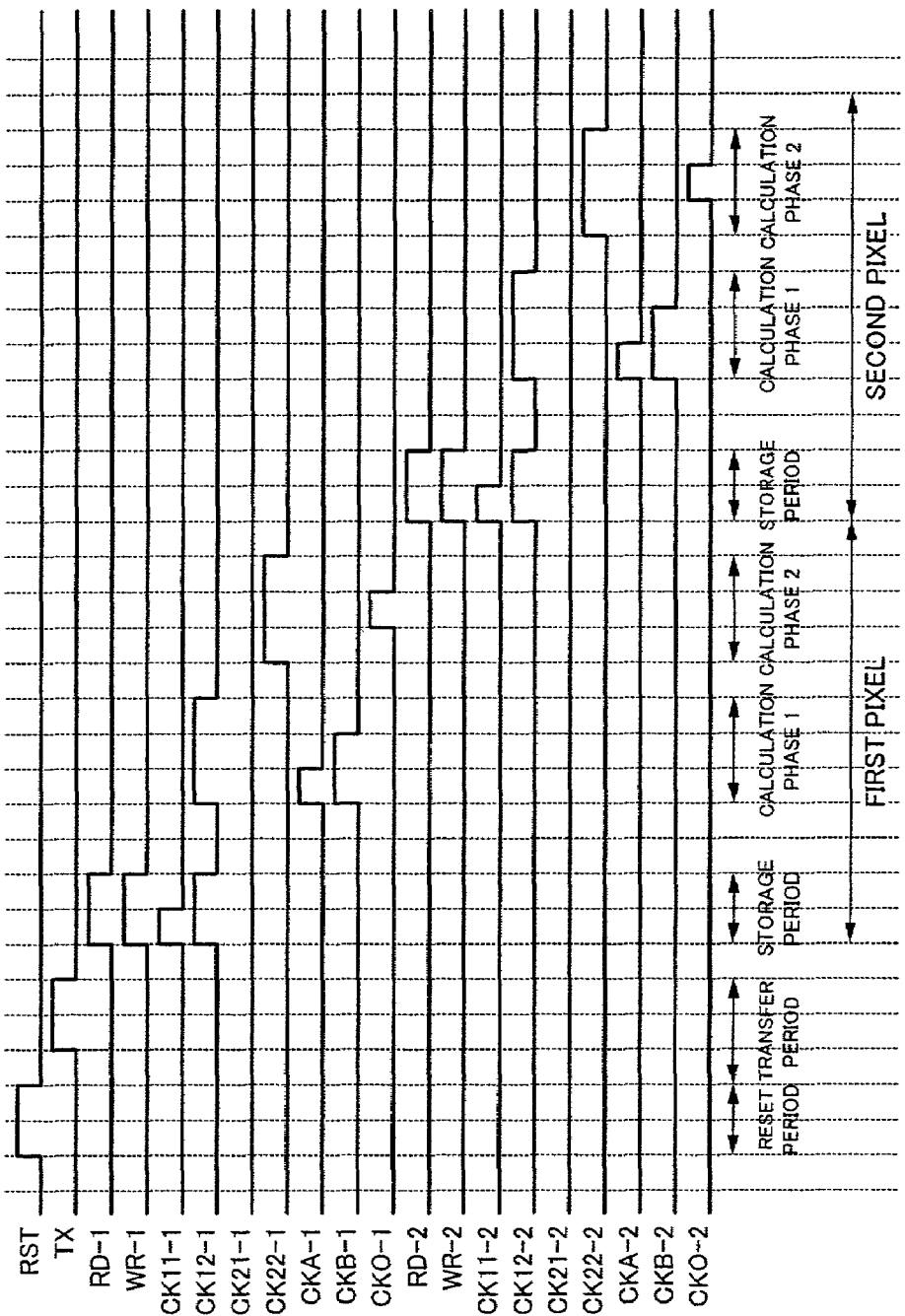
FIG. 5 is a timing chart showing operational characteristics of a photographing device according to an embodiment of the present invention.

FIG. 5 shows operational characteristics of a photographing device according to an embodiment in the format of a timing chart. However, in FIG. 5, only clocks for two pixels are illustrated.

In FIG. 5, reset period and transfer period are in common with all pixels. Alternatively, even if reset period and transfer period differ in each pixel, the above-described operations can be accomplished. However, in the latter case, the timing of the photo-electrically conversion slightly deviates in each pixel.

In the above-described embodiment, two current signals that are stored are compared. However, in the structure of the pixel 1 according to an embodiment, three or more current signals can be compared.

In an embodiment, it is understood that four storing portions of first to fourth storing portions 40-1 to 40-4 are disposed and that signals currents IM1, IM2, IM3, and IM4 that have been received and photo-electrically converted are stored to memory transistors M1 to M4, respectively.

In the calculation phase 1 of the load portion and calculating portion 50, the memory gate transistors G1 and G2 are activated at the same time. Thus, the signal currents IM1 and IM2 flow to the load transistor (QL). As a result, the load current V1 takes place.

In the calculation phase 2, the memory gate transistors G3 and G4 are activated at the same time. Thus, the signal currents IM3 and IM4 flow to the load transistor (QL). As a result, the load current V2 takes place.

According to an above-described embodiment, when V2 is larger than V1, the signal level of the output of the calculating portion 50 becomes high. In contrast, when V2 is smaller than V1, the signal level of the output of the calculating portion 50 becomes low. In such a manner, the signal currents IM1, . . . , stored in the plurality of storing portions 40-1 can be compared.

Figure 6:
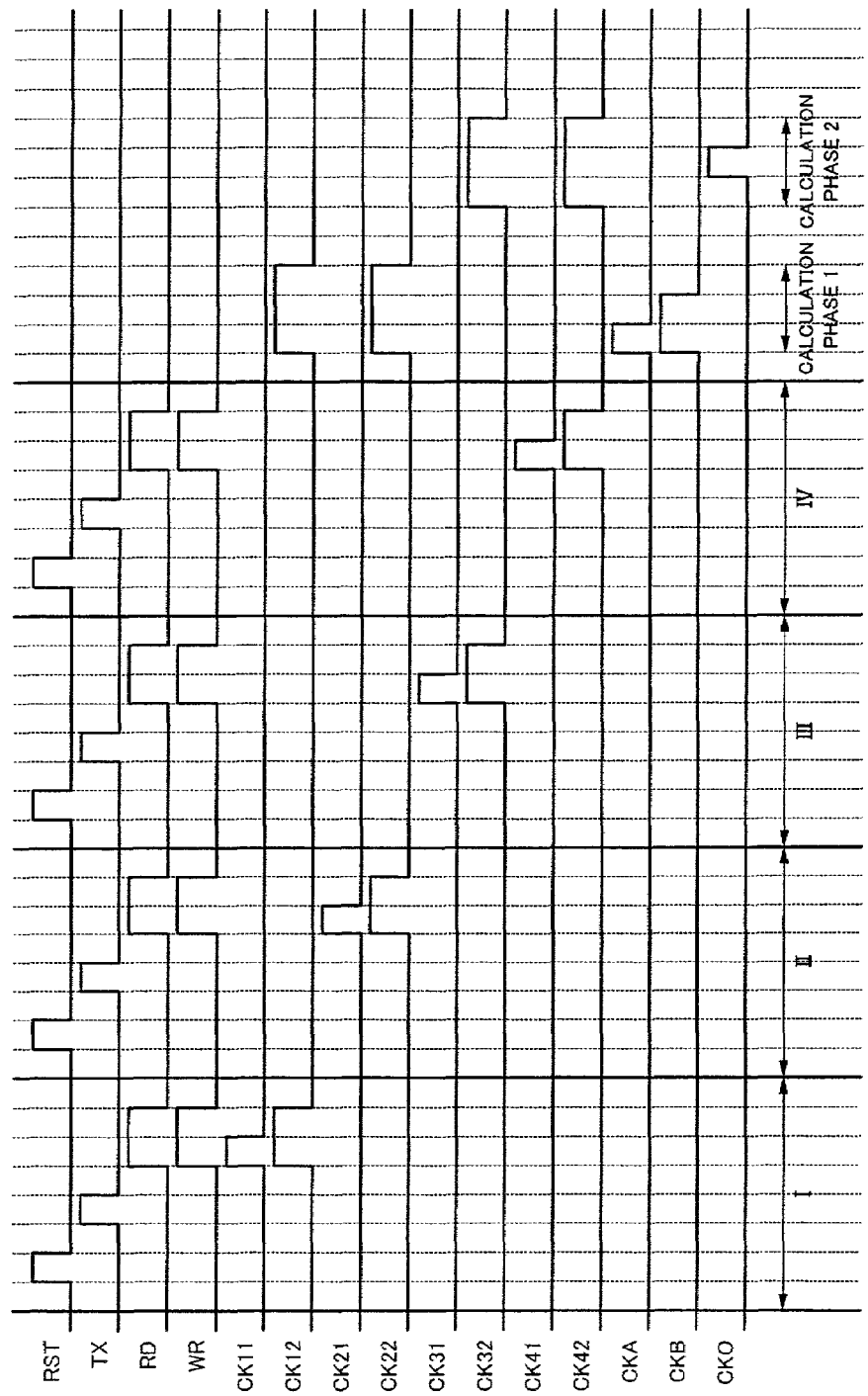
FIG. 6 is a timing chart showing operational characteristics of current signals stored in storing portions which are compared according to an embodiment of the present invention.

FIG. 6 shows operational characteristics in the case that the signal currents IM1, . . . stored in the plurality of storing portions 40-1, . . . are compared in the form of a timing chart. However, in FIG. 6, drive clocks for one pixel are illustrated.

Figure 7:
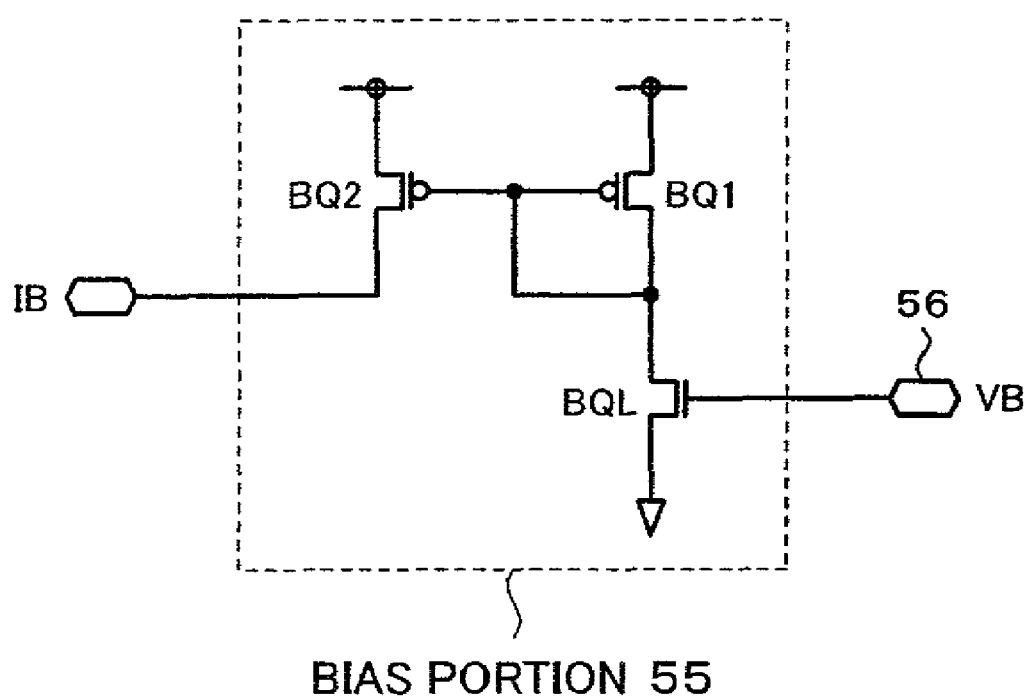
FIG. 7 is a schematic diagram showing an embodiment of the structure of a circuit including a bias portion.

FIG. 7 shows the structure of an embodiment, a circuit of the bias portion 55. The bias portion 55 adds an offset current to the input signal IM of the load portion and calculating portion 50 so as to eliminate influence of noise or the like.

As shown in FIG. 7, in an embodiment the bias portion 55 is composed of a bias load transistor (BQL), a bias transistor (BQ1), and a bias transistor (BQ2). The bias transistor (BQ1) and the bias transistor (BQ2) form a current mirror circuit. An offset bias voltage (VB) is applied to the gate terminal of the bias load transistor (BQL). The operation point of the bias load transistor (BQL) is varied by the offset bias voltage (VB). An output of the bias transistor (BQ2) is extracted as a bias current (IB).

In the structure shown in FIG. 7, the offset bias voltage (VB) can be controlled from the outside. In the calculation phase 1, the bias current (IB) is added to the signal current that is extracted from the storing portion 40 and supplied to the load transistor (QL) of the calculating portion 50. In contrast, in the calculation phase 2, the bias current (IB) is not added to the extracted signal current. As a result, the output of the calculating portion 50 becomes stable.

When the signal levels of two signals that are compared are almost the same and slightly change time by time, the output of the calculating portion 50 repeatedly and unstably changes between the high level and the low level. To overcome this problem, as was described above, a bias current is superimposed to a current extracted in the calculation phase 1 so that the current extracted in the calculation phase 1 is larger than a current extracted in the calculation phase 2. As a result, the output of the calculating portion can be kept to either the low level or the high level (in an embodiment, kept in the low level) such that the output of the calculating portion 50 becomes stable.

When the current extracted in the calculation phase 2 is larger than the sum of the bias current component and the current extracted in the calculation phase 1, the output of the calculating portion 50 changes from the low level to the high level.

It is determined whether or not a current flows to the bias load transistor (BQL) depending on whether the offset bias voltage (VB) is applied. As a result, the value of the bias current (IB) depends on the effect of current mirror. However, to accurately control the value of the current, it is necessary to accurately control the offset bias voltage (VB). Thus, there is a situation in which the offset bias voltage (VB) cannot be accurately controlled. In particular, the threshold voltage of the bias load transistor (BQL) fluctuates. The bias current (IB) varies for each pixel. Thus, the result may vary.

To overcome this problem, an embodiment of the present invention varies the amount of the bias current (IB) by an amount related to the difference in value of the offset bias voltage (VB) rather than the absolute value of the offset bias voltage (VB), so that an output of the calculating portion 50 can become stable.

In an embodiment, in the calculation phase 1, the offset bias voltage VB1 is applied to the bias load transistor (BQL). The bias current that flows at the time is denoted by IB2. Next, in the calculation phase 2, when the offset bias voltage is denoted by VB2, the bias current is denoted by IB2. When the threshold voltages of the bias load transistors (BQL) are different from each other, the absolute values of IB1 and IB2 may largely vary. However, the difference IB1–IB2 can be remarkably suppressed. As a result, the current difference supplied as a bias becomes stable in the calculation phase 1 and the calculation phase 2.

In addition, considering the effect of current mirror, when the sizes of the transistors are designed so that the current that flows in the bias transistor (BQ2) is smaller than the current that flows in the bias transistor (BQ1) (namely, the bias load transistor (BQL)), the influence of the fluctuation of the threshold voltage can be reduced.

Next, with reference to FIG. 3, in the pixel 1 according to an embodiment of the present invention, the characteristics (namely, threshold voltages) of the memory transistors M1 to Mk as structural elements of the storing portions 40 can be suppressed from fluctuating.

In an embodiment, it is understood that the gate voltage VA of the amplifying transistor (QA) of the first amplifying portion 20 is constant.

When a read pulse (RD) is applied, the read transistor (GR1) is activated. As a result, a predetermined amount of current flows to the mirror transistor (CM1) that composes the current mirror.

Conversely, a predetermined amount of current that depends on the size ratio of the transistor CM1 flows in the other mirror transistor (CM2) that composes the current mirror as long as the mirror transistor (CM2) operates in the saturation region. In an embodiment, the predetermined amount of current is temporarily denoted by IMA.

When the read transistor (GR2), the memory gate transistor (G1), and the memory switch (SW1) are activated at the same time, IMA flows to the memory transistor (M1).

At that point, the threshold voltage and the gate voltage (=drain voltage) of the memory transistor (M1) are denoted by Vth-1 and VG-1, respectively. The common signal voltage between the memory gate transistor (G1) and the read transistor (GR2) is denoted by VM-1.

Likewise, when the above-described operation is performed for the memory transistor (M2) rather than the memory transistor (M1), the current IMA flows to the memory transistor (M2). At that point, the threshold voltage and the gate voltage (=drain voltage) of the memory transistor (M2) are denoted by Vth-2 and VG-2, respectively. The common signal voltage between the memory gate transistor (G2) and the read transistor (GR2) is denoted by VM-2.

When the size of the memory transistor (M1) is completely the same as that of the memory transistor (M2) and the threshold value of the former is the same as that of the latter (namely, Vth-1=Vth-2), as long as the same current flows thereto, the relations of VG-1=VG-2 and VM-1=VM-2 are satisfied.

However, although the sizes of the transistors are the same, if their threshold voltages are different (namely, Vth-2=Vth-1+ΔVth) due to fluctuations in production (or another cause), to allow the same current IMA to flow thereto, it is necessary to change the gate voltage VG-2 of the memory transistor by ΔVG and the common signal voltage VM-2 by ΔVM.

Such voltage changes affect the drain voltage of the mirror transistor (CM2) of the current mirror circuit of the second amplifying portion 30. Unless the mirror transistor (CM2) operates in the saturation region, the current IMA does not flow unlike in the normal case.

Thus, when the sizes of the memory transistors, the memory gate transistors, the read transistors, and the mirror transistors are properly selected, they have proper margins of operation points. In addition, when the mirror transistor is designed so that it always operates in the saturation state, even if voltage fluctuations ΔVG and ΔVM due to fluctuations of the threshold voltages take place, the signal current IMA that is stored does not change.

Figure 8:
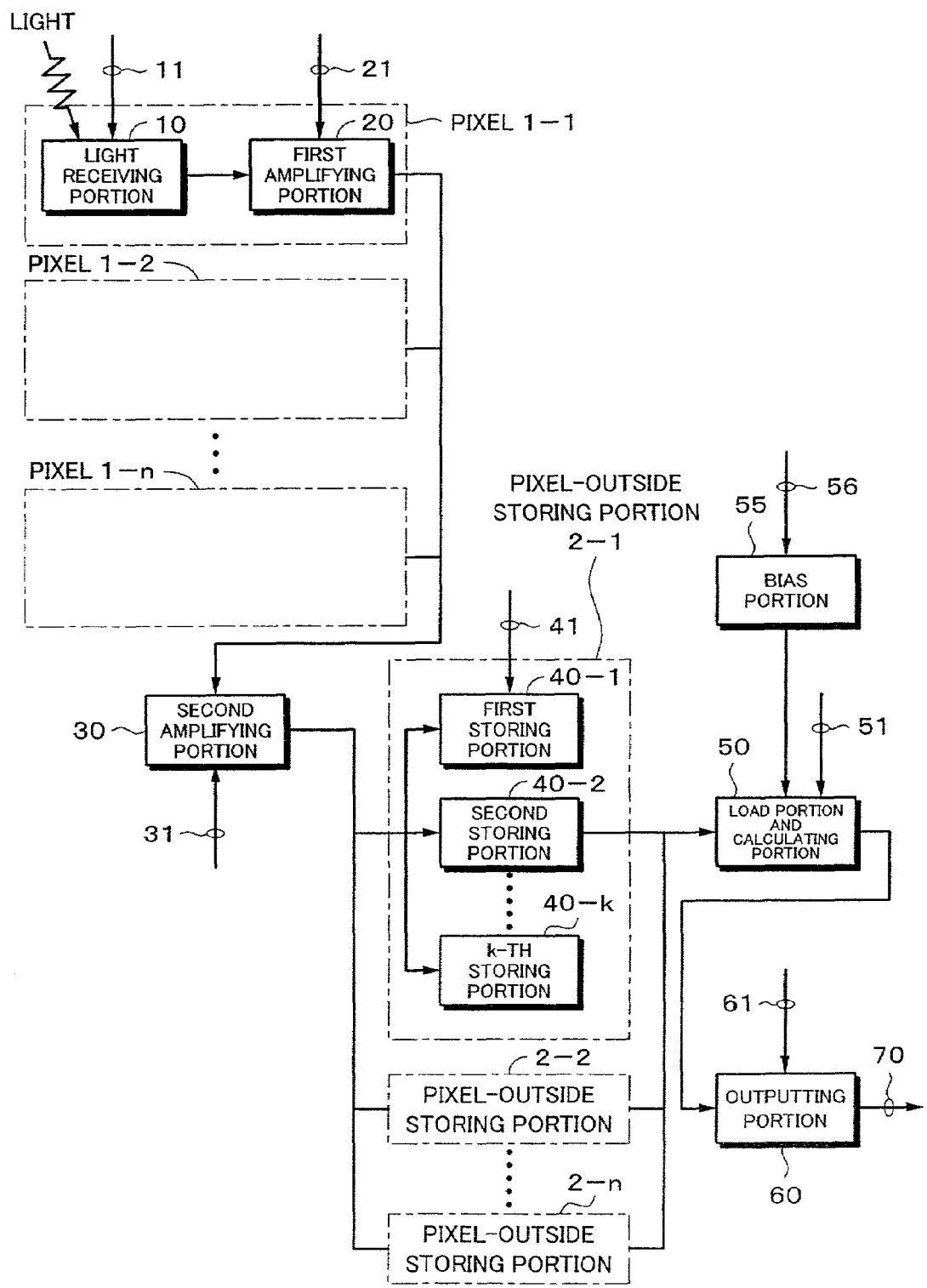
FIG. 8 is a schematic diagram showing an embodiment modifying the structure of the photographing device shown in FIG. 1 and the structure of the pixel shown in FIG. 2.

FIG. 8 shows an embodiment modifying the structure of the photographing device shown in FIG. 1 and the structure of the pixel shown in FIG. 2.

It should be understood from the timing charts shown in FIGS. 5 and 6, with n pixels arranged in the vertical direction, although the reset and transferring operation may be performed at the same time, the storing operation and the calculating operation can be performed at different times. Thus, it is not always necessary to dispose the second amplifying portion 30 (which generates a signal current to be stored), the load portion and calculating portion 50 (which processes a signal generated by the storing portion 40), the outputting portion 60, and the bias portion 56 in each pixel. In an embodiment, they can be shared by a plurality of pixels.

When these structural elements are disposed in each pixel, as the number of pixels increases, they may result in a bottleneck in producing the device. Thus, in an embodiment it is preferred to dispose these structural elements outside each pixel.

In the structure of the pixel shown in FIG. 8, in each of pixels 1-1 to pixel 1-*n* arranged in the vertical direction, only a light receiving portion and a first amplifying portion 20 are disposed. One second amplifying portion 30 is disposed for outputs of the pixel 1-1 to pixel 1-*n*. In other words, the second amplifying portion 30 is shared by a plurality of pixels on the same column.

In addition, a pixel-outside storing portion 2-1 to a pixel-outside storing portion 2-*n* are disposed corresponding to the pixel 1-1 to the pixel 1-*n*, respectively. Each of the storing portions 2-1, . . . contains a first storing portion 40-1 to a k-th storing portion 40-*k*.

Conversely, a load portion and calculating portion 50 and an outputting portion 60 are shared by the pixel-outside storing portion 2-1 to the pixel-outside storing portion 2-*n*. Thus, even if the bias portion 55 is disposed in the photographing device, only one bias portion 55 is required for the load portion and calculating portion 50.

Figure 9:
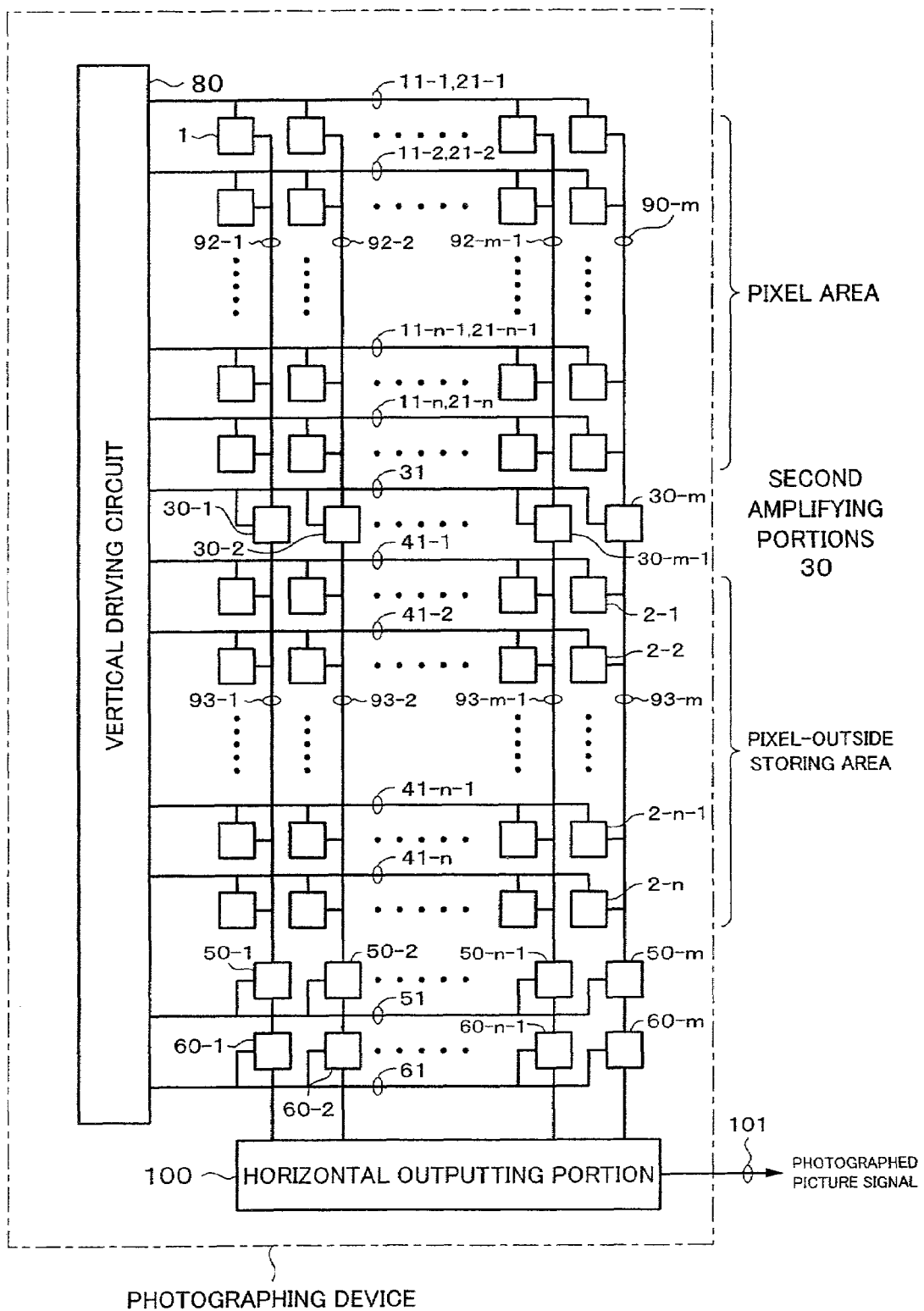
FIG. 9 is a schematic diagram showing another embodiment modifying the structure of the photographing device shown in FIG. 1 and the structure of the pixel shown in FIG. 2.
Figure 10:
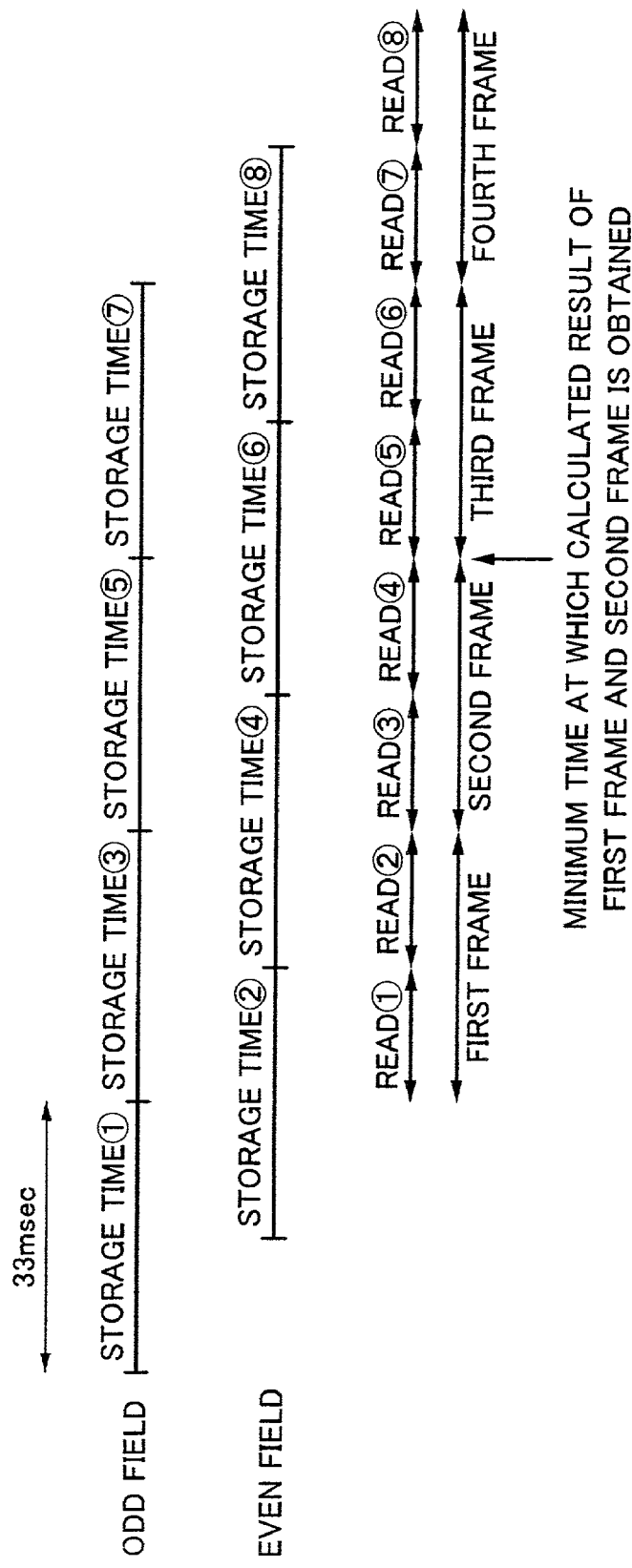
FIG. 10 is a timing chart showing a photographed picture being stored and read when a CCD is used as the photographing device.

FIG. 9 shows another embodiment modifying the structure of the photographing device shown in FIG. 1 and the structure of the pixel shown in FIG. 2. In FIG. 8, n pixels arranged in the vertical direction of the photographing device and a calculation processing portion are illustrated. In contrast, in FIG. 9, such a circuit structure is repeated in the horizontal direction as pixels arranged in a matrix.

In other words, in an embodiment of the photographing device shown in FIG. 9, a pixel area is composed of m×n pixels arranged in the horizontal direction and the vertical direction of a matrix. Below the pixel area, m second calculating portions 30 are disposed in the horizontal direction. Below the second calculating portions 30, a pixel-outside storing area is disposed. The pixel-outside storing area is composed of m×n pixel-outside storing portions arranged in the horizontal direction and the vertical direction of a matrix. Below the pixel-outside storing area, an area composed of load portions and calculating portions 50 and outputting portions 60 is disposed. Below the area, a horizontal outputting portion 100 is disposed.

As with the embodiment shown in FIG. 1, a vertical driving circuit 80 supplies a light receiving portion drive signal 11 and a first amplifying portion drive signal 21 to the m pixels arranged in the horizontal direction. A second amplifying portion drive signal 31 is supplied to the second amplifying portions 30. A storing portion drive signal 41 is supplied to the pixel-outside storing portions 2. A calculating portion drive signal 51 is supplied to the load portions and calculating portions 50. An outputting portion drive signal 61 is supplied to the outputting portions 60.

Outputs of the n pixel 1-1 to pixel 1-*n* arranged in the vertical direction are connected by vertical pixel signal lines 92. The signal lines are inputs of the second amplifying portions 30. Outputs of the second amplifying portions 30 are connected to all the n pixel-outside storing portion 2-1 to pixel-outside storing portion 2-*n* arranged in the vertical direction and inputs of the load portions and calculating portions 50.

In an embodiment, the circuit structures and operational characteristics of the light receiving portions 10, the first amplifying portions 20, the second amplifying portions 30, the storing portions 40, the load portions and calculating portions 50, the bias portions 55, and the outputting portions 60 disposed in the photographing device shown in FIG. 9 are substantially similar to those shown in FIGS. 3, 4, and 5.

In an embodiment, the overall operation of the photographing device shown in FIG. 9 is almost the same as that shown in FIG. 1 except that drive signals for the second amplifying portions 30, the load and calculating portions 50, and the outputting portions 60 for n pixels arranged in the vertical direction are independent rather than in common.

Figure 11:
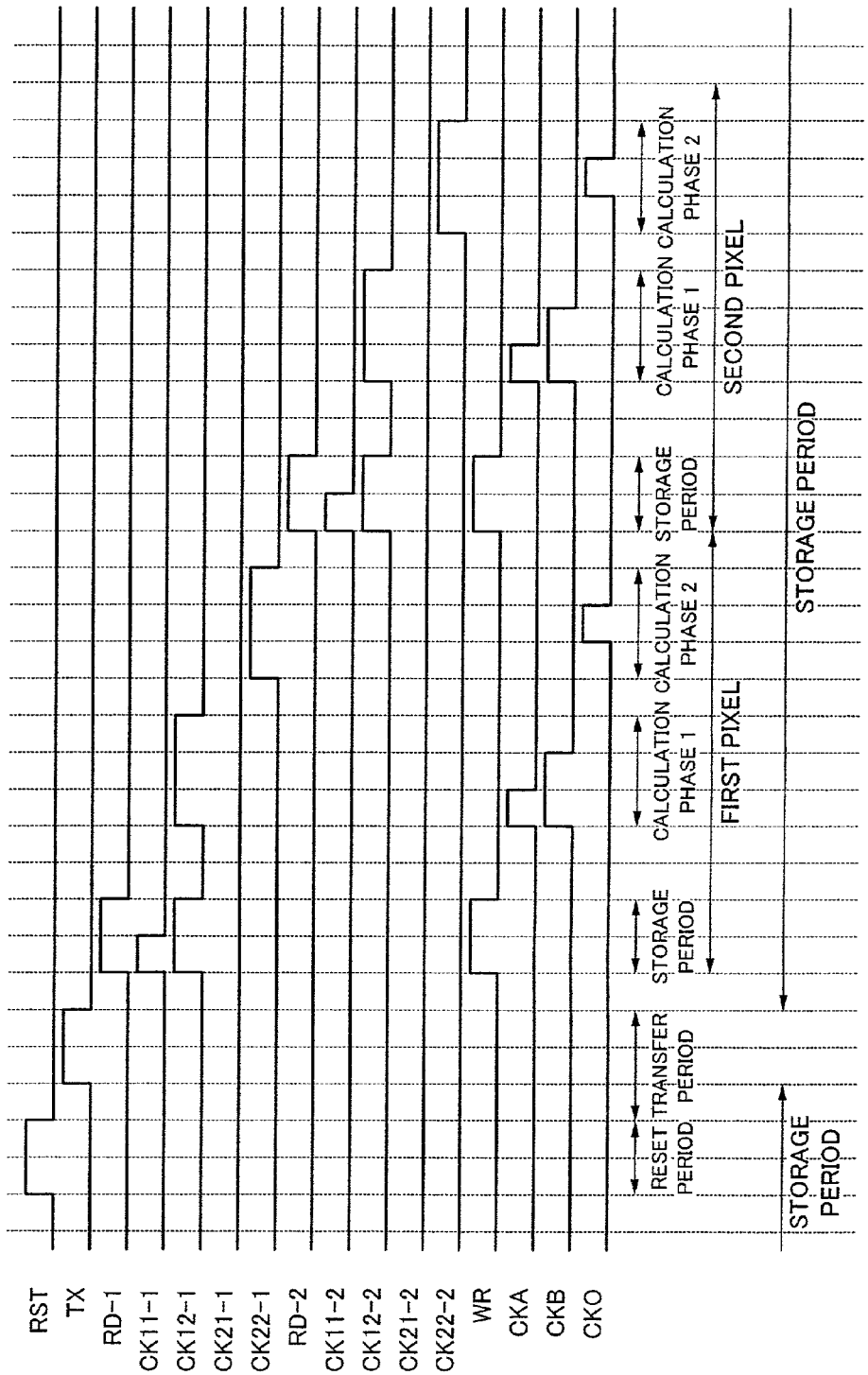
FIG. 11 is a timing chart showing operational characteristics of the photographing device shown in FIG. 9.

FIG. 11 is a timing chart showing operational characteristics of the photographing device shown in FIG. 9. The different between the timing charts shown in FIGS. 11 and 5 is in that the write pulse (WR) for driving the read transistor (GR2) of the second amplifying portion 30, the inverter pulses (CKA) and (CKB) for driving the inverter switch (SWA) and the inverter switch (SWB) of the load portion and calculating portion 50, respectively, and the output pulse (CK0) of the outputting portion 60 are in common with n pixels arranged in the vertical direction.

An application of the photographing device according to an embodiment will be described with reference to FIG. 12 which schematically shows an active type distance measuring system for measuring the distance to an object (for details of the theory of active type distance measurement, refer to for example "Measuring three-dimensional picture" by Iguchi and Sato, Sho-ko Do). In an embodiment, shown in FIG. 12, an object is composed of a plane and an almost semi-cylinder. The plane faces the measuring system. The almost semi-cylinder protrudes from the front.

Slit-shaped laser light radiated from a semiconductor laser (or a light emitting diode) is reflected by a rotating mirror. The reflected light travels toward the object. When the radiation of the laser light is synchronized with the rotation of the rotating mirror, the laser light can be scanned in the left and right directions of the drawing. A camera can photograph laser light that is radiated to the plane and the semi-cylinder time by time. The photographing device (see FIG. 1 or FIG. 9) can be applied for the camera of the distance measuring system.

Figure 12:
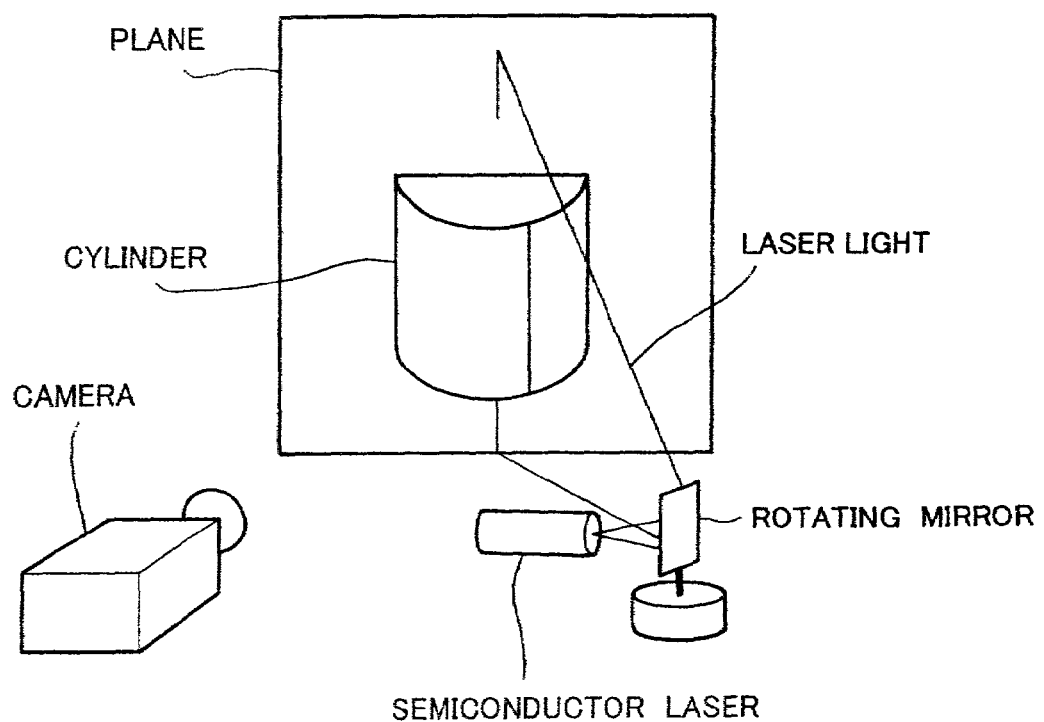
FIG. 12 is a schematic diagram showing the structure of an active type distance measuring system to which the photographing device according to an embodiment is applied.
Figure 13:
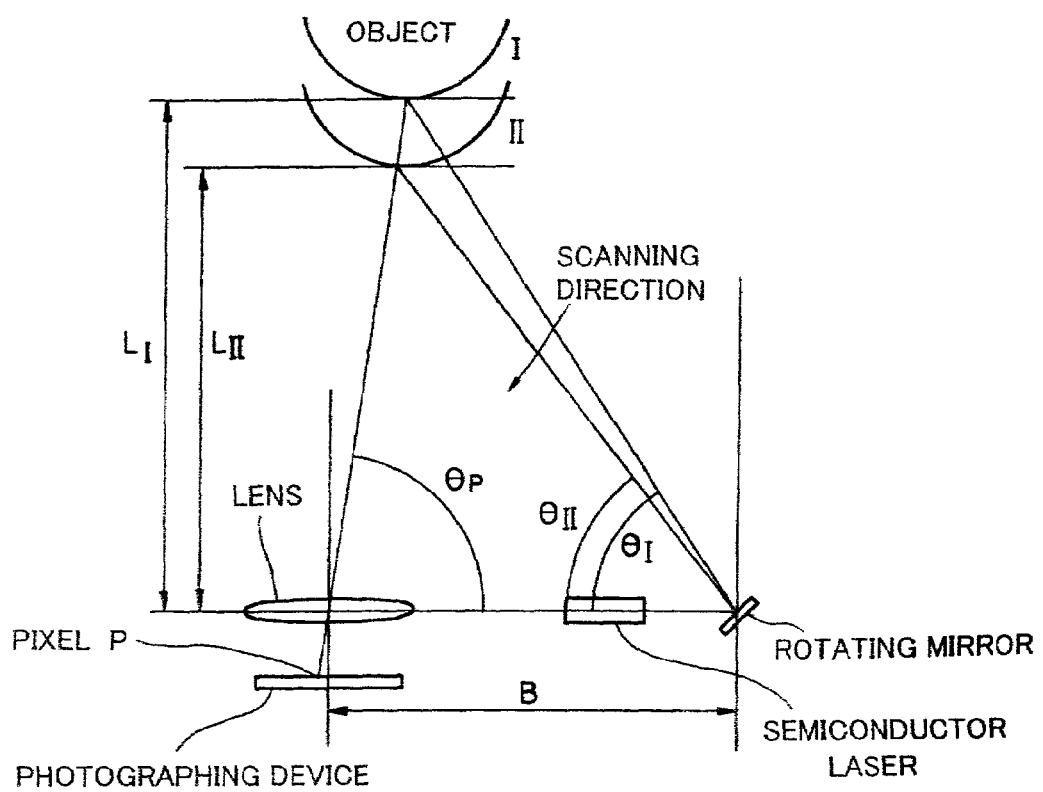
FIG. 13 is a plan view showing the distance measuring system shown in FIG. 12.

FIG. 13 is a plan view showing an embodiment of the distance measuring system shown in FIG. 12. The camera is composed of a photographing device of which a predetermined number of light receiving elements such as fine pixels are arranged in a two-dimensional matrix shape, each of pixels being capable of detecting the intensity of received light. The camera can collect the reflected light of the object with a lens, photograph the object, and obtain the position of the received light.

In an embodiment, one pixel P on the photographing device always observes only the direction of view line through the lens. The direction of view line is denoted by ΘP.

The rotating mirror that scans the laser light has its rotation center axis at the position apart from the optical axis of the lens by a distance B. Starting the rotation at time zero, the rotating mirror scans the slit-shaped laser light to the front surface of the object from the right to the left of the drawing.

Since the pixel P observes only the direction ΘP of view line, if the object is placed at a position I, as shown in FIG.

13, only when the rotating mirror is rotated and the laser radiation angle becomes ΘI can the pixel P receive the reflected light of the front surface of the object. Likewise, if the object is placed at a position II, only when the rotating mirror is rotated and the laser radiation angle becomes ΘII can the pixel P receive the reflected light of the front surface of the object.

Thus, with a geometric calculation such as a triangulation, the distances LI and LII between the distance measuring system and the object can be expressed by the following formulas.

$$LI = \frac{B \times \tan\Theta I \times \tan\Theta P}{\tan\Theta I + \tan\Theta P}$$

$$LII = \frac{B \times \tan\Theta II \times \tan\Theta P}{\tan\Theta II + \tan\Theta P}$$

Thus, with the radiation directions ΘI and ΘII of laser light received by the pixel P, the distances LI and LII to the object can be uniquely obtained.

In an embodiment, both the radiation angles ΘI and ΘII can be expressed as functions with respect to elapsed time t after which the rotating mirror starts rotating. Thus, the distances LI and LII to the object can be expressed as functions with respect to time t.

Figure 14:
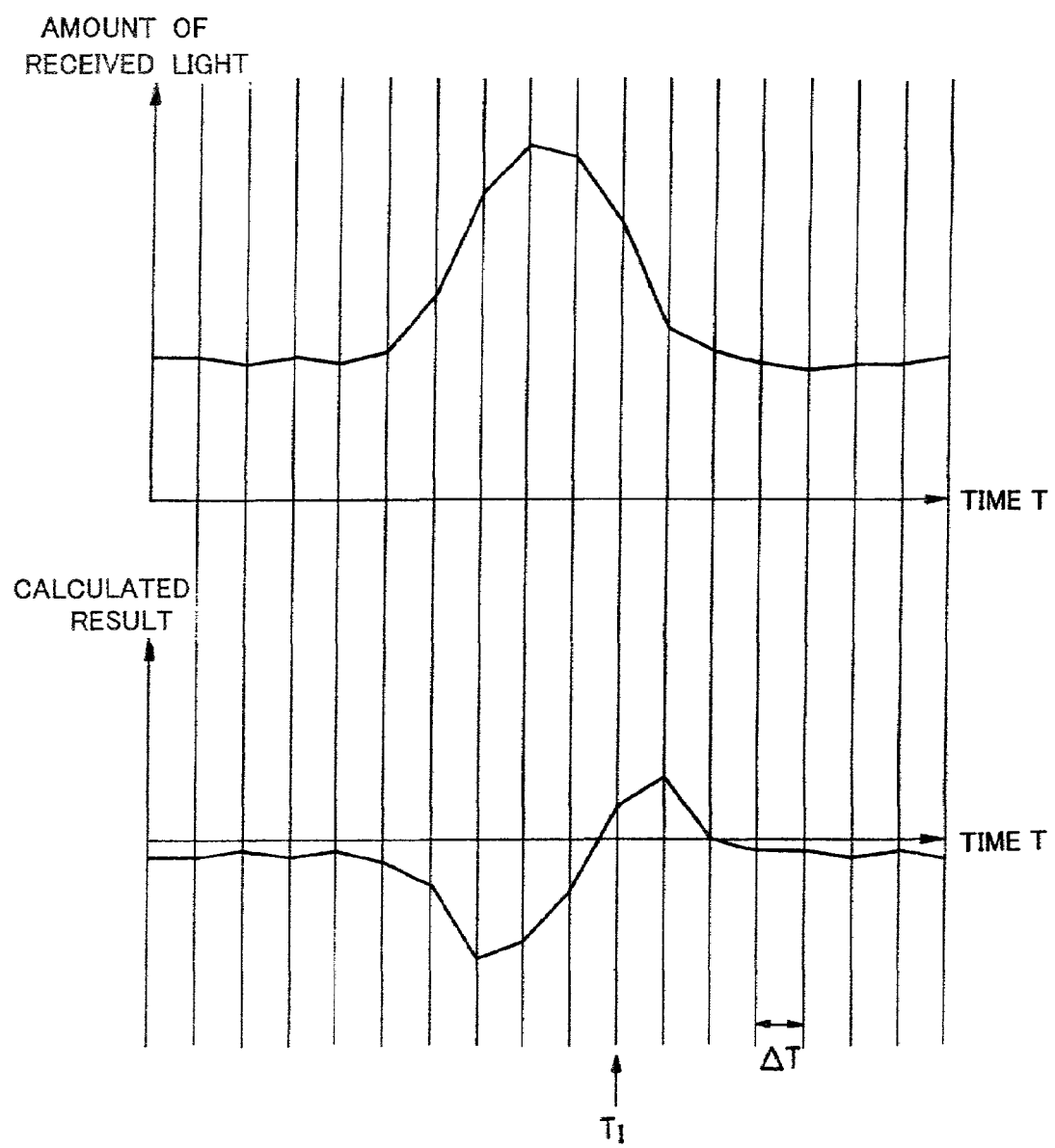
FIG. 14 is a schematic diagram showing a temporal change of light intensity that a photographing device receives and a calculated result of the change of the intensity by the photographing device.

FIG. 14 shows a temporal change of intensity of light received by the photographing device and a calculated result of which the change of the intensity is calculated by the photographing device according to an embodiment.

In an embodiment shown in FIG. 14, at time TI, the sign of the calculated result changes from minus to plus. Based on the change point of the sign, the peak time of the light intensity can be detected (however, in the embodiment shown in FIG. 14, it is understood that the photographing device has an output characteristic in which the amount of current decreases in proportion to the amount of received light (namely, the intensity of received light). When the peak time of the light intensity can be detected, as was described above, the distance to the object can be obtained.

In the embodiment shown in FIG. 14, the calculating interval (namely, the sampling period of the photographing device) is denoted by ΔT. When ΔT is shortened, the resolution of the distance measurement can be improved.

Next, the process that has been described with reference to FIGS. 12 to 14 will be explained for an embodiment using a conventional photographing device.

The calculating interval ΔT is equivalent to the video rate, for example, around 30 Hz or 60 Hz. Thus, when the object is moving, it is very difficult to accurately measure the distance to the object.

Even if the object is motionless, to obtain the distance of the entire front surface of the object, it is necessary to scan laser at each photographing timing of 30 Hz or 60 Hz. Thus, it will take a very long time to measure the distance.

Moreover, the time necessary for the picture process for obtaining the laser position based on the photographed picture cannot be ignored (i.e., it is not negligible).

In contrast, when the photographing device according to an embodiment of the present invention is applied, the calculating interval can be remarkably shortened. Thus, even if an object is moving, the distance thereto can be accurately measured.

As described above, according to an embodiment of the present invention, an excellent picture processing apparatus for obtaining the difference between picture frames can be provided so as to obtain a temporal change of brightness of an object.

In addition, according to an embodiment of the present invention, an excellent picture processing apparatus of which a photographing device and a storing portion for storing photographed data photographed thereby are disposed on the same circuit can be provided so as to perform a calculating process at high speed.

Moreover, according to an embodiment of the present invention, an excellent picture processing apparatus that allows characteristics of a storing portion to be suppressed from fluctuating and an accurately calculated output to be obtained in a situation of which a temporal change of brightness of an object is small can be provided.

According to the structure of the picture processing apparatus in an embodiment of the present invention, since a storing portion and a photographing device are disposed on the same circuit, the process can be performed at high speed. In addition, since a bias portion adds an offset current to a current signal that is output from the storing portion and that has not been calculated, the influence of characteristics of the storing portion can be suppressed, thereby allowing an output of the calculating portion to become stable.

For example, when the picture processing apparatus according to an embodiment of the present invention is used as a pixel and each pixel is arranged in a matrix shape on the same circuit, a photographing device with a calculating function can be structured. With the photographing device, a temporal change of brightness of an object can be calculated at high speed.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A picture processing apparatus including a plurality of pixels, each pixel comprising:
    a light receiving portion for generating an electric signal corresponding to an intensity of a received light;
    an amplifying portion for amplifying the electric signal generated by the light receiving portion;
    a plurality of storing portions, wherein each of the storing portions stores, as a current signal, the electric signal amplified by the amplifying portion;
    a load portion for converting the current signal stored by each of the storing portions into a voltage signal;
    a bias portion for supplying an offset current to an input of the load portion;
    a calculating portion for calculating an output signal of the load portion based on the voltage signal converted by the load portion; and
    an outputting portion for outputting a calculated result of the calculating portion,
    wherein the storing portions are directly connected to the amplifying portion and the load portion.

2. The picture processing apparatus as claimed in claim 1, wherein the plurality of storing portions store current signals corresponding to the intensity of light received in different time periods, and wherein the calculating portion performs a calculating process using voltage signals from at least two different time periods based on current signals extracted from at least two of the plurality of storing portions.

3. The picture processing apparatus as claimed in claim 2, wherein the calculating process comprises at least one of addition, subtraction, and comparison.

4. The picture processing apparatus as claimed in claim 1, wherein the amplifying portion comprises a first mirror transistor and a second mirror transistor connected such that a gate electrode of the first mirror transistor faces a gate electrode of the second transistor, thereby amplifying the current signal based on current mirror amplification.

5. The picture processing apparatus as claimed in claim 1, wherein each of the storing portions includes a current copier circuit for storing the current signal.

6. The picture processing apparatus as claimed in claim 1, wherein the bias portion supplies an offset current to one of two current signals being compared by the calculating portion, the two current signals being supplied by two of the plurality of storage portions.

7. A plurality of pixels operable within a photographing device, the pixels arranged on a circuit in a matrix, for detecting a brightness of an object, each of the pixels comprising:
 a light receiving portion for generating an electric signal corresponding to an intensity of a received light;
 an amplifying portion for amplifying the electric signal generated by the light receiving portion;
 a plurality of storing portions, wherein each of the storing portions stores, as a current signal, the electric signal amplified by the amplifying portion;
 a load portion for converting the current signal stored by each of the storing portions into a voltage signal;
 a bias portion for supplying an offset current to an input of the load portion;
 a calculating portion for calculating an output signal of the load portion based on the voltage signal converted by the load portion; and
 an outputting portion for outputting a calculated result of the calculating portion,
 wherein the storing portions are directly connected to the amplifying portion and the load portion.

8. The plurality of pixels as claimed in claim 7, wherein the plurality of storing portions store current signals corresponding to the intensity of light received in different time periods, and wherein the calculating portion performs a calculating process using voltage signals from at least two different time periods based on current signals extracted from at least two of the plurality of storing portions.

9. The plurality of pixels as claimed in claim 8, wherein the calculating process comprises at least one of addition, subtraction, and comparison.

10. The plurality of pixels as claimed in claim 7, wherein the amplifying portion comprises a first mirror transistor and a second mirror transistor connected such that a gate electrode of the first mirror transistor faces a gate electrode of the second transistor, thereby amplifying the current signal based on current mirror amplification.

11. The plurality of pixels as claimed in claim 7, wherein each of the storing portions includes a current copier circuit for storing the current signal.

12. The plurality of pixels as claimed in claim 7, wherein the bias portion supplies an offset current to one of two current signals being compared by the calculating portion, the two current signals being supplied by two of the plurality of storage portions.

13. A photographing device for detecting a brightness of an object, comprising:
 a pixel area in which pixels are arranged in a matrix, each pixel comprising a light receiving portion for generating an electric signal corresponding to an intensity of a received light and an amplifying portion for amplifying the electric signal generated by the light receiving portion;
 a second amplifying area in which second amplifying portions are arranged in each column of the matrix of the pixels in the pixel area, wherein each of the second amplifying portions amplifies a current signal based on current mirror amplification by a first mirror transistor and a second mirror transistor connected such that a gate electrode of the first mirror transistor faces a gate electrode of the second mirror transistor;
 a pixel-outside storing area in which a plurality of storing portions are arranged in a matrix corresponding to the arrangement of the pixels in the pixel area, wherein each of the storing portions stores, as a current signal, the electric signal that has been amplified;
 a load portion and calculating portion area in which a plurality of load portions and a plurality of calculating portions are arranged in each column of the matrix of the pixels of the pixel area, wherein each of the load portions converts the current signal of the corresponding storing portion into a voltage signal, and wherein each of the calculating portions performs a calculating process; and
 an outputting portion area in which a plurality of outputting portions are arranged in each column of the matrix of the pixels of the pixel area, wherein each of the outputting portions outputs a calculated result of the corresponding calculating portion;
 wherein the pixel area, the second amplifying portion area, the pixel-outside storing area, the load portion and calculating portion area, and the outputting portion area are disposed on a circuit, and wherein the storing portions are directly connected to the second amplifying area and the load portion.

14. The photographing device as claimed in claim 13, wherein the plurality of storing portions store current signals corresponding to the received light in different periods, and wherein the calculating portion performs a calculating process using voltage signals based on current signals extracted from at least two of the plurality of storing portions.

15. The picture processing apparatus as claimed in claim 14, wherein the calculating process comprises at least one of addition, subtraction, and comparison.

16. The photographing device as claimed in claim 13, further comprising a bias portion for adding an offset current to the current signal stored by each of the storing portions.

17. The photographing device as claimed in claim 16, wherein the bias portion supplies an offset current to one of two current signals being compared by the calculating portion, the two current signals being supplied by two of the plurality of storage portions.

18. The photographing device as claimed in claim 13, wherein each of the storing portions includes a current copier circuit for storing the current signal.

* * * * *